(12) United States Patent
George et al.

(10) Patent No.: US 11,586,490 B2
(45) Date of Patent: Feb. 21, 2023

(54) SYSTEM AND METHOD OF IDENTIFYING SELF-HEALING ACTIONS FOR COMPUTING SYSTEMS USING REINFORCEMENT LEARNING

(71) Applicant: HEWLETT PACKARD ENTERPRISE DEVELOPMENT LP, Houston, TX (US)

(72) Inventors: Aneesh George, Bangalore (IN); Rashmi M.G., Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 87 days.

(21) Appl. No.: 16/836,079

(22) Filed: Mar. 31, 2020

(65) Prior Publication Data
US 2021/0303388 A1    Sep. 30, 2021

(51) Int. Cl.
| | |
|---|---|
| *G06F 11/07* | (2006.01) |
| *G06F 11/34* | (2006.01) |
| *H04L 29/08* | (2006.01) |
| *G06N 20/00* | (2019.01) |
| *H04L 67/10* | (2022.01) |

(52) U.S. Cl.
CPC ...... *G06F 11/0793* (2013.01); *G06F 11/0709* (2013.01); *G06F 11/0751* (2013.01); *G06F 11/3409* (2013.01); *G06F 11/3452* (2013.01); *G06N 20/00* (2019.01); *H04L 67/10* (2013.01)

(58) Field of Classification Search
CPC ........... G06F 11/00; G06F 11/07–0709; G06F 11/0751; G06F 11/0793; G06F 11/30; G06F 11/34; G06F 11/3409; G06F 11/3452; G06N 20/00; H04L 67/00; H04L 67/10
See application file for complete search history.

(56) References Cited

U.S. PATENT DOCUMENTS

| | | | |
|---|---|---|---|
| 7,924,446 B2 * | 4/2011 | Nemmaier | B41J 29/393 |
| | | | 358/1.14 |
| 8,429,097 B1 | 4/2013 | Sivasubramanian et al. | |

(Continued)

OTHER PUBLICATIONS

Mayank, "Reinforcement Learning with Q tables", ITNEXT (Year: 2018).*

(Continued)

*Primary Examiner* — Boris D Grijalva Lobos
(74) *Attorney, Agent, or Firm* — Trop, Primer & Hu, P.C.

(57) ABSTRACT

Example implementations relate to method and system for implementation of a software agent in a computing system, to identify the most effective self-healing action to build a Q-table by applying a reinforcement learning technique. In particular, the method includes determining an induced state of the computing system based on an error in one or more components of the computing system and selecting a corrective action corresponding to the induced state based on a plurality of Q-values stored in the Q-table. The method further includes executing the corrective action in the computing system and evaluating one or more parameters of the computing system to determine a current state of the computing system. Further, the method includes updating a Q-value of the plurality of Q-values corresponding to the corrective action, in response to evaluation of the current state of the computing system, to build the Q-table.

17 Claims, 5 Drawing Sheets

(56) References Cited

U.S. PATENT DOCUMENTS

| | | | |
|---|---|---|---|
| 2014/0082417 A1* | 3/2014 | Barton | G06F 11/079 |
| | | | 714/26 |
| 2016/0224401 A1* | 8/2016 | Adinarayan | G06F 11/0793 |
| 2017/0316204 A1 | 11/2017 | Thakur et al. | |
| 2019/0318254 A1* | 10/2019 | Lobete | G06N 20/00 |
| 2019/0324873 A1* | 10/2019 | Patel | G06F 11/0793 |
| 2021/0065006 A1* | 3/2021 | Bade | G06N 20/00 |

OTHER PUBLICATIONS

Cioara et al., "A Reinforcement Learning based Self-Healing Algorithm for Managing Context Adaptation", iiWAS2010 Proceedings, Nov. 8-10, 2010, pp. 859-862.

Juan Martinez, "1Desk Brings Advanced Self-Healing to Autonomics", available online at <https://www.ipsoft.com/2018/10/29/1desk-brings-advanced-self-healing-autonomics/>, Oct. 29, 2018, 5 pages.

Steve Garrison, "Simplifying On-Premises Infrastructure with Self-Driving Clouds", available online at <https://www.missioncriticalmagazine.com/articles/89919-simplifying-on-premises-infiastructure-with-self-driving-clouds>, Mar. 6, 2017, 4 pages.

Sutton et al., "Reinforcement Learning: An Introduction", The MIT Press, Second edition, in progress, Nov. 5, 2017, 445 pages.

Vladimir Fedak, "How to Create a Self-Healing IT Infrastructure", available online at <https://dzone.com/articles/how-to-create-a-self-healing-it-infrastructure>, DevOps Zone, Sep. 26, 2018, 13 pages.

\* cited by examiner

FIG. 2

| PLURALITY OF INDUCED STATES | PLURALITY OF CORRECTIVE ACTIONS ($A_{1-n}$) | | | | | | | | | |
|---|---|---|---|---|---|---|---|---|---|---|
| | $PA_1$ | $PA_2$ | $PA_3$ | ..... | $PA_n$ | $MA_1$ | $MA_2$ | $MA_3$ | ..... | $MA_n$ |
| $S_1$ | 10 | 5 | -5 | 0 | 0 | 0 | 0 | 0 | 0 | 0 |
| $S_2$ | 0 | 10 | -5 | 0 | 5 | 0 | 0 | 0 | 0 | 0 |
| $S_3$ | 5 | 0 | 10 | 0 | 0 | 0 | 0 | 10 | 0 | 0 |
| $S_4$ | 0 | 0 | 0 | 0 | 5 | 5 | 5 | 0 | 0 | 0 |
| $S_5$ | 0 | 0 | 10 | 0 | 10 | -10 | 10 | -5 | 0 | 0 |
| $S_6$ | 5 | -5 | 0 | 0 | 0 | 5 | -5 | 10 | 0 | 0 |
| $S_7$ | 10 | 0 | 10 | 0 | 5 | 5 | 5 | 0 | 0 | 5 |
| $S_8$ | 5 | 10 | 5 | 0 | 0 | 0 | 10 | 0 | 0 | 10 |
| $S_9$ | -5 | 0 | -5 | 0 | 5 | 10 | -10 | 5 | 0 | 0 |
| $S_{10}$ | 10 | 10 | 10 | 0 | -5 | 10 | 0 | 10 | 0 | 5 |
| ..... | - | - | - | - | - | - | - | - | - | - |
| $S_n$ | 0 | 10 | -10 | 0 | 0 | 10 | 0 | 5 | 0 | 0 |

114

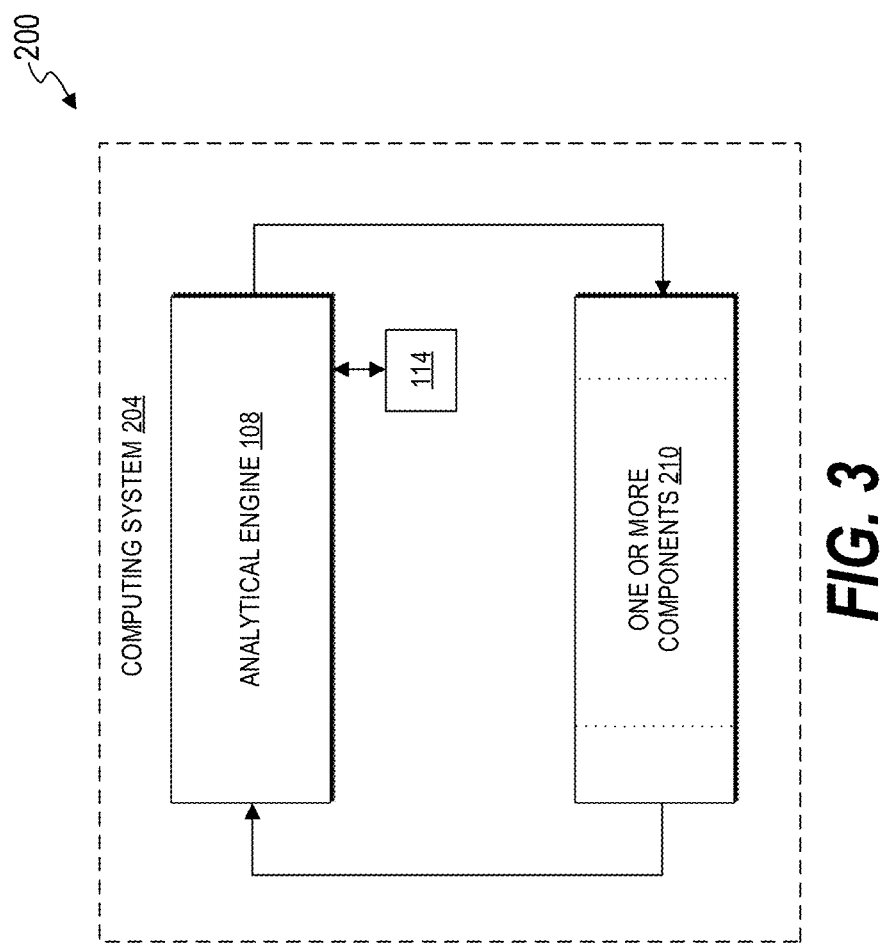

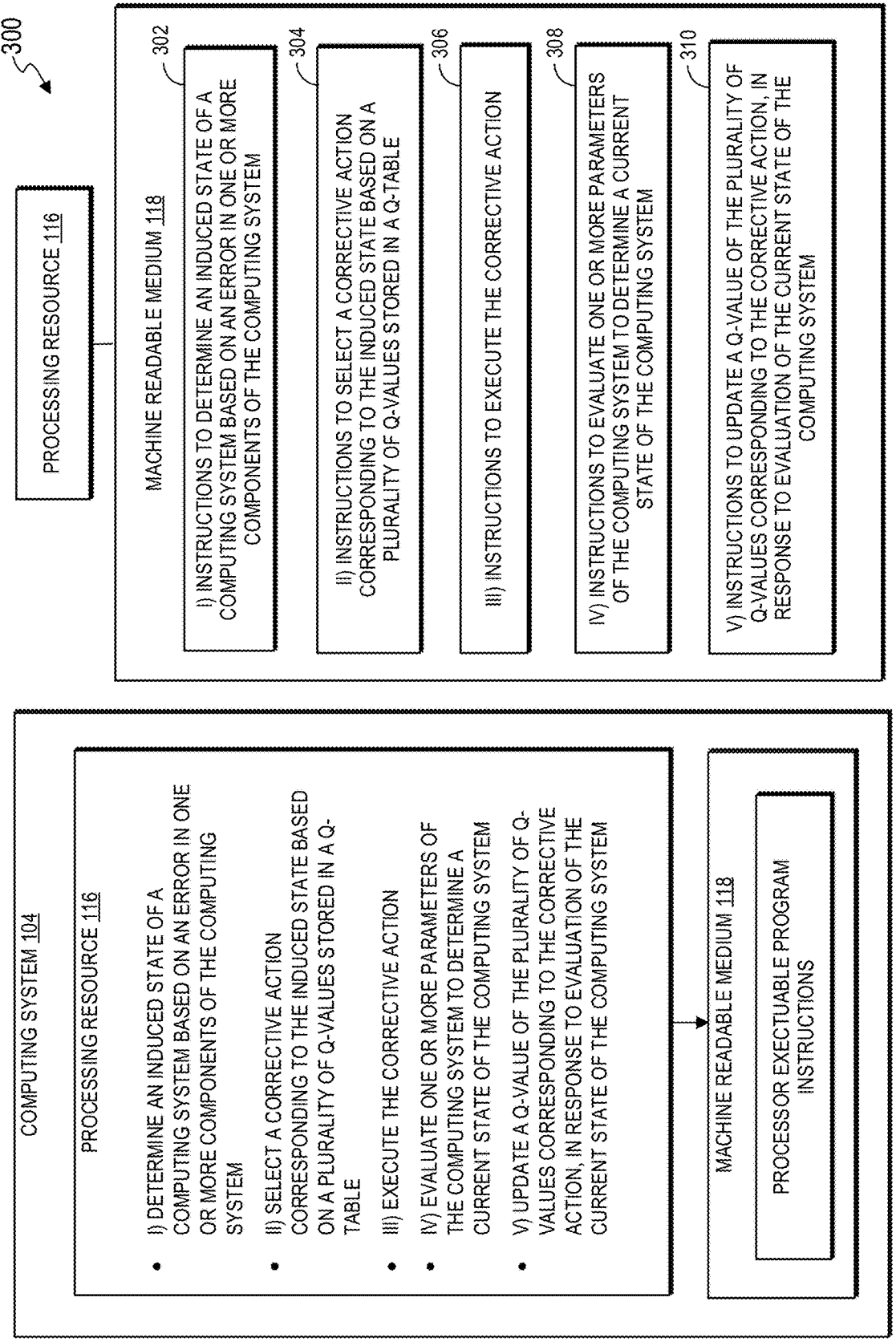

SYSTEM AND METHOD OF IDENTIFYING SELF-HEALING ACTIONS FOR COMPUTING SYSTEMS USING REINFORCEMENT LEARNING

BACKGROUND

A processor-based system can include any number of computing devices. For example, the processor-based system, such as a server rack system may include multiple computing systems (e.g., blade servers), networking devices, storage devices, power supply components, and so forth. Further, each of the multiple computing systems may include one or more components, such as a central processing unit (CPU) and a memory module, and the like. In a mission-critical production environment context, such as a network-supported medical alert and other emergency services, or financial transactions, or online retailing services, each of the multiple computing systems is expected to be "highly available". Whenever fault events (errors or anomalies) occur in the one or more components of such computing system, those fault events may have to be immediately root caused and some corrective actions needs to be applied to mitigate those errors. Typically, human experts or rule based automation tools are used for root causing the fault events and applying the corrective actions to the computing system.

BRIEF DESCRIPTION OF THE DRAWINGS

Various examples will be described below with reference to the following figures.

FIG. 2 is an example Q-table, in accordance with embodiments of the present disclosure.

FIG. 3 is a block diagram depicting an example environment in which an analytical engine utilizes a built Q-table to select an appropriate self-healing action to resolve an error in a computing system, in accordance with embodiments of the present disclosure.

FIG. 4 is a block diagram depicting a computing system having a processing resource operably coupled to a machine readable medium storing executable program instructions, in accordance with embodiments of the present disclosure.

FIG. 5 is a block diagram depicting a processing resource and a machine readable medium encoded with example instructions to process data in a computing system, in accordance with embodiments of the present disclosure.

Figure 1:
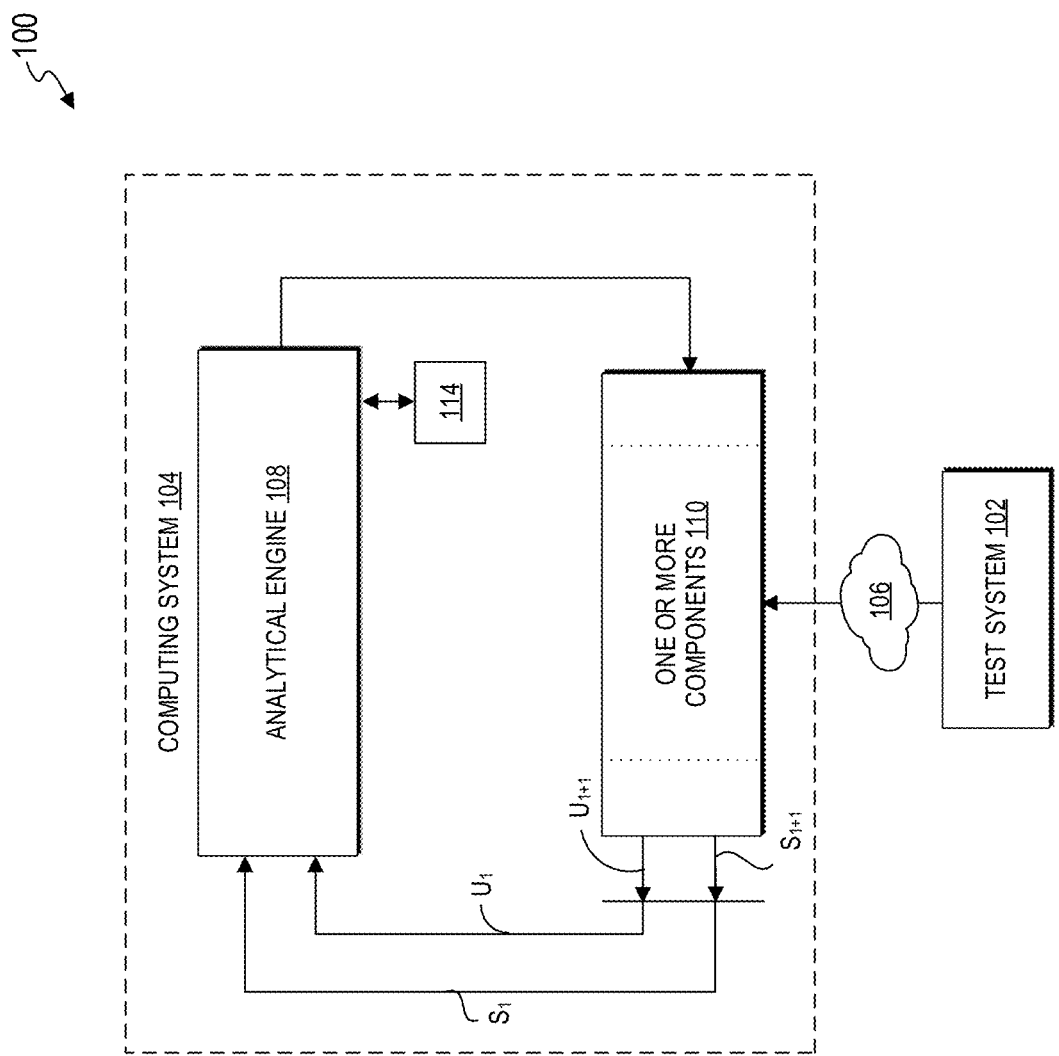
FIG. 1 is a block diagram depicting an example environment in which an analytical engine facilitates building a Q-table by applying reinforcement learning, in accordance with embodiments of the present disclosure.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The present disclosure describes example implementations of a system and a method of identifying self-healing actions (corrective actions) for computing systems using a reinforcement learning technique. In particular, the present disclosure teaches building a Q-table having the self-healing actions for the computing system, by applying the reinforcement learning technique. In one or more examples, the Q-table includes a data structure organized as an N-by-M matrix, with columns including a plurality of corrective actions, rows including a plurality of induced states, and each matrix cell including a Q-value indicative of a performance impact of the corresponding corrective action towards an error in an induced state of a computing system. Since, the Q-value indicates the performance impact of each corrective actions towards the error, the Q-table may be used to reliably and accurately resolve the errors in the computing system. The Q-table is built in a test environment by using an analytical engine. In such examples, while building the Q-table, the analytical engine may reward or punish the self-healing actions that are applied to resolve errors in one or more components of the computing system.

Once the Q-table is built in the test environment, the analytical engine along with the Q-table may be deployed in another environment, such as a mission-critical production environment. In such examples, whenever an error occurs in the computing system of the production environment, the analytical engine may access the Q-table for selecting and applying the self-healing actions in real-time, to mitigate the errors in the computing system, and thereby allowing the computing system to be "highly available" for providing the intended mission-critical services. In some embodiments, the analytical engine deployed in the production environment may also update the Q-table based on new learnings of resolving errors in one or more components of the computing system.

Figure 6:
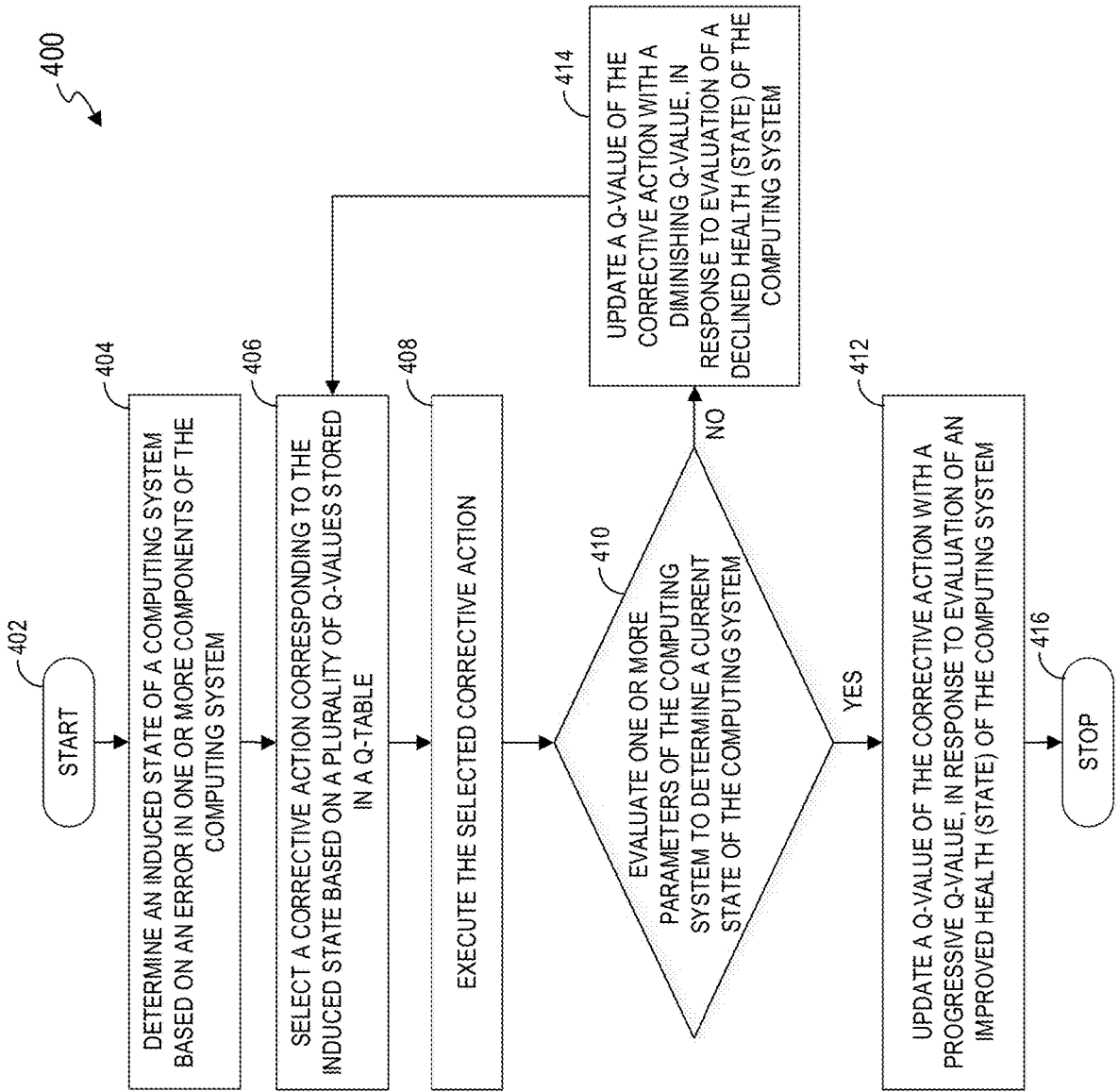
FIG. 6 is a flow diagram depicting a method of building a Q-table by applying reinforcement learning, in accordance with embodiments of the present disclosure.

For purposes of explanation, certain examples are described with reference to the components illustrated in FIGS. 1-6. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIG. 6 is an example and is not intended to be limiting. Additional or fewer operations or combinations of operations may be used or may vary without departing from the scope of the disclosed examples. Thus, the present disclosure sets forth possible examples of implementations, and many variations and modifications may be made to the described examples. Such modifications and variations are intended to be included within the scope of this disclosure and protected by the following claims.

In some computing systems, health metrics are generated and analyzed to ensure that system requirements are being satisfied. It should be noted herein that the term a "health metric" may be indicative of a health condition of each of a plurality of components operating in a computing system. In such examples, human experts may periodically track the health condition of each component by analyzing the health metrics. If an anomaly (or error) is detected in the health metric, the human experts may root cause the anomaly, and then apply some remedial actions to address/resolve the anomaly in the computing system.

Accordingly, resolving such anomalies by the human experts may require a considerable amount of time, effort, and/or expense. To address such problems in the art, a rule-based engine having a static set of rules was developed. Whenever, there is an anomaly in the computing system, the rule-based engine may use the static set of rules to automatically select and apply the remedial action for resolving the anomaly in the computing system. Accordingly, the rule-based engine may take considerably less amount of time, effort, and/or expense to address the anomaly in the computing system. However, such a rule-based engine may not evaluate the outcome of the remedial actions that have been applied on the computing system. For example, in some instances the remedial action applied by the rule-based engine did not improve the health of the computing system or further degraded the health of the computing system. Thus, the current rule-based engine failed to account into outcomes of the remedial actions applied on the computing system. Accordingly, the current rule-based engine may be inefficient and/or unpredictable in terms of selecting and applying an appropriate remedial action to resolve the errors in the computing system. Further, considering complexity of the computing system used in the production environment, defining static set of rules in the rule-based engine for all possible errors, may be practically impossible.

A technical solution to the aforementioned problems includes building a Q-table based on a reinforcement learning technique in a test environment, and using the built Q-table in a production environment to automatically select and apply corrective actions for resolving the anomalies in a computing system. In particular, the Q-table is built based on a concept of a feedback mechanism detailed in the reinforcement learning technique. In some examples, an analytical engine is used to build the Q-table. In such example embodiments, the analytical engine may either reward or punish the corrective action used to resolve an error in the computing system. In some examples, the analytical engine may reward the corrective action that has successfully resolved the error (e.g., predefined error), and not introduced any new error in the computing system. Similarly, the analytical engine may punish the corrective action that has either not resolved the induced error or introduced the new error in the computing system. Thus, the Q-table may include a stored data structure organized as an N-by-M matrix, where each matrix cell may include a Q-value indicative of a performance impact (effectiveness) of the corrective action towards the error in the computing system. In one or more examples, the Q-table may initially have a neutral Q-value, for example, "zero value" in each matrix cell. The analytical engine may update the initial Q-value in each matrix cell based on the impact of the corresponding corrective action in resolving the error at each induced state of the computing system.

During the process of building the Q-table (or updating the Q-value of the Q-table), a test system deployed in a test environment may introduce errors (predetermined errors) in the computing system to bring the computing system into one or more induced states of the computing system. It should be noted herein the term "test environment" may include computing resources, which are only used for testing a predefined use case/test case defined by the human experts. It should be noted herein that the term "state" is indicative of a health condition of the computing system, where the term "health" is a measure of an optimal or an ideal operating condition of the computing system. For example, the computing system may be considered to be behaving normally or operating healthy, when a plurality of parameters corresponding to one or more components of the computing system are within a predefined range or threshold. If any parameter of the plurality of parameters deviates from the predefined range or threshold, then the computing system may be considered to be operating in an unhealthy/abnormal condition. Further, the term "induced state" may refer to the unhealthy condition of the computing system, which may have caused due to willful/forced modification of at least one parameter of the plurality of parameters, to deviate from the predefined range or threshold, in the test environment. In some examples, the analytical engine may select one or more corrective actions based on the Q-value to mitigate/resolve the error in the induced state of the computing system. Thereby, build the Q-table in parallel, for each of the plurality of induced states of the computing system. It may be noted herein that the plurality of induced states and the plurality of corrective actions are predefined by the human experts.

In some example embodiments, the analytical engine may include a software module deployed within the computing system. However, in some other example embodiments, the analytical engine may a hardware module, such as an embedded controller that is operably coupled to the computing system.

In some examples, once the Q-table is built in the test environment, the analytical engine along with the Q-table may be deployed in a mission-critical production environment. It should be noted herein the term "production environment" may include computing resources, which are used to execute the customer workload for performing/providing intended services. In such examples, whenever an error occurs in the computing system of the production environment, the analytical engine may access the Q-table to select and apply a self-healing action to resolve the error in the computing system. In particular, the analytical system may first determine the induced state of the computing system. Once, the analytical engine determines the induced state of the computing system, it may select at least one corrective action based on the Q-value stored in the Q-table, and apply the self-healing action to the computing system in real-time, to mitigate the error in the computing system. Since, the corrective actions are pretested in the test environment, the analytical engine may provide the accurate and predicable resolution to the computing system, thereby allowing the computing system of the mission-critical production environment to be "highly available" for providing the intended services. In some other examples, the analytical engine deployed in the production environment may also update the Q-table based on new learnings of resolving errors in one or more components of the computing system.

FIG. 1 illustrates an example environment, such as a test environment 100 utilized for building a Q-table by applying reinforcement learning techniques. The test environment 100 may include a setup of software and hardware for testing experts, to execute a plurality of test cases on a computing system in order to build the Q-table. In some examples, the test environment 100 includes a test system 102 and a computing system 104.

The test system 102 may be an automated testing system, such as a management firmware testing tool (MFTT) or a system firmware testing tool (SFTT), and the like. In one or more examples, the test system 102 may execute the plurality of test cases to induce/introduce/simulate an error (predefined error) in the computing system 104 to bring the computing system 104 into one or more induced states. The functionality of the test system 102 is described in greater details below.

Further, the test system 102 is operably coupled to the computing system 104 over a network 106. In such examples, the network 106 may be a TCP/IP (Transmission Control Protocol/Internet Protocol) network, which is a suite of communication protocols used to interconnect network devices on internet. In some other examples, the test system 102 may be coupled to the computing system 104 via a wired network.

The computing system 104 may be a server, for example, a rack mounted server or a blade server. It may be noted herein that the computing system 104 deployed in the test environment 100, and a computing system of a production environment (not shown in FIG. 1) may have a similar hardware and software configuration. In some examples, the computing system 104 includes an analytical engine 108 and one or more components 110. In the illustrated embodiment, the analytical engine 108 is deployed within the computing system 104. In such example embodiments, the analytical engine 108 is a software module implemented using a processing resource (not shown in FIG. 1) of the computing system 104. In particular, the processing resource may implement functionalities of the analytical engine 108 by executing program instructions stored in a machine readable medium (not shown in FIG. 1) of the computing system 104.

In some other embodiments, the analytical engine 108 may be a hardware module operably coupled to the computing system 104. In such example embodiments, the hardware module may include a processor for implementing functionalities of the analytical engine 108 by executing program instructions stored in a memory of the hardware module. The functionalities of the analytical engine 108 is described in greater details below.

In some examples, the one or more components 110 of the computing system 104 may include at least one of a processing unit, a memory unit, and the like. It may be noted herein that the one or more components 110 listed hereinabove is for an example purpose, and the aforementioned list may not be construed as a limitation of the present disclosure. Further, each of the one or more components 110 may have a plurality of parameters "$P_1$-$P_7$", for example, where each parameter is indicative of a health condition of the corresponding component 110. It should be noted herein the term "parameter" may be a status indicator of the health condition of the one or more components 110.

Table-1 depicted below represents a sample list of the one or more components 110 and the plurality of parameters "$P_1$-$P_7$" corresponding to the one or more components 110.

It may be noted herein that the table-1 depicted below is for example purpose only. Accordingly, a minimum configuration of the computing system 104 for example, one processing unit (i.e., CPU) and memory unit (i.e., Dual in-line Memory Unit (DIMM)) are shown.

TABLE 1

| ONE OR MORE COMPONENTS | PLURALITY OF PARAMETERS |
|---|---|
| PROCESSING UNIT | $P_1$ |
|  | $P_2$ |
|  | $P_3$ |
| MEMORY UNIT | $P_4$ |
|  | $P_5$ |
|  | $P_6$ |
|  | $P_7$ |

Referring to table-1, the processing unit may have three parameters "$P_1$, $P_2$, $P_3$", which may define the health condition of the processing unit. Similarly, the memory unit may have four parameters "$P_4$, $P_5$, $P_6$, $P_7$", which may define the health condition of the memory unit. It may be noted that the number of parameters for each of the one or more components 110 mentioned in table-1 is for merely for an example purpose, and the numbers of parameters may also vary depending on the type of component and manufacturer of the component.

In some examples, the parameters "$P_1$, $P_2$, $P_3$" corresponding to the processing unit may include a), total utilization per core b), system utilization per core and c) user utilization per core respectively. In some other examples, the parameters "$P_1$, $P_2$, $P_3$" corresponding to the processing unit may include a) software interrupt requests per core, b) hardware interrupt requests per core, and c) load average per partition. Similarly, the parameters "$P_4$, $P_5$, $P_6$, $P_7$" corresponding to the memory unit may include a) corrected ECC error count b) NVDIMM persistence status, c) controller errors, and d) erasure metrics respectively.

The computing system 104 may be considered to be healthy, when each of the plurality of parameters "$P_1$-$P_7$" corresponding to the one or more components 110 are within a predefined range or threshold. In some examples, if any parameter of the plurality of parameters "$P_1$-$P_7$" deviates from the predefined range, then the computing system 104 may be considered to be in the unhealthy condition. In some examples, the plurality of parameters "$P_1$-$P_7$" and the predefined range for each of the plurality of parameters "$P_1$-$P_7$" may be provided by the manufacturer of the respective component of the one or more components 110.

In one or more examples, the computing system 104 may be subjected to a plurality of induced states "$S_1$-$S_n$" based on the predefined error in the one or more components 110. Therefore, each of the plurality of induced states "$S_1$-$S_n$" may be defined as a function of the error in the one or more components 110 of the computing system 104.

In some examples, the function may be represented by a formula (1), as mentioned below:

$$S=\{\{CPU\}+\{MEM\}+\{CPU \times MEM\}\} \quad (1)$$

Further, it should be noted herein that the formula (1) shown above is derived by considering only the processing unit and memory unit. The formula (1) may be revised/updated based on more number of components of the computing system 104. Referring to the formula (1) above, the term "S" refers to the state of the computing system, the term "CPU" refers to the error in the parameter corresponding to the processing unit, and the term "MEM" refers to the error in the parameter corresponding to the memory unit.

Table-2 depicted below represents the plurality of induced states "$S_1$-$S_n$" and the plurality of parameters "$P_1$-$P_7$" corresponding to the one or more components 110.

TABLE 2

| PLURALITY STATES OF INDUCED | PROCESSING UNIT | | | MEMORY UNIT | | | |
|---|---|---|---|---|---|---|---|
| | $P_1$ | $P_2$ | $P_3$ | $P_4$ | $P_5$ | $P_6$ | $P_7$ |
| $S_0$ | 0 | 0 | 0 | 0 | 0 | 0 | 0 |
| $S_1$ | 0 | 1 | 0 | 0 | 0 | 0 | 0 |
| $S_2$ | 0 | 1 | 1 | 0 | 0 | 0 | 0 |
| $S_3$ | 1 | 0 | 0 | 0 | 0 | 0 | 0 |
| $S_4$ | 0 | 0 | 0 | 0 | 0 | 0 | 1 |
| $S_5$ | 0 | 0 | 0 | 1 | 0 | 0 | 1 |
| $S_6$ | 0 | 1 | 0 | 0 | 0 | 0 | 1 |
| $S_7$ | 1 | 0 | 0 | 0 | 0 | 1 | 0 |
| $S_8$ | 1 | 0 | 1 | 1 | 0 | 0 | 0 |
| $S_9$ | 0 | 0 | 1 | 1 | 0 | 1 | 0 |
| $S_{10}$ | 1 | 0 | 1 | 1 | 1 | 0 | 0 |
| ⋮ | — | — | — | — | — | — | — |
| $S_n$ | 1 | 1 | 1 | 1 | 1 | 1 | 1 |

Referring to table-2, a value "0" denotes that the corresponding parameter is within the predefined range (or healthy condition), and a value "1" denotes that the corresponding parameter is deviated from the predefined range (unhealthy condition). It should be noted herein that the values "0" and "1" are some example ways of representing the current status of the one or more components 110. The values "0" and "1" should not be construed as binary values of the computing system 104. In some examples, the plurality of induced states "$S_1$-$S_n$" is predefined by the human experts based on analysis of historical support cases. It may be noted herein that the historical support cases may include details about a plurality of errors and a corresponding resolution to each of the plurality of errors.

Referring to table-2, the computing system 104 may be considered to be in healthy or optimal or ideal condition at an initial state "$S_0$". In other words, each of the plurality of parameters "$P_1$-$P_7$" having the "0" value at the initial state "$S_0$" is indicative of the healthy condition of the computing system 104.

Further, a first induced state "$S_1$" indicates that the computing system 104 has encountered an error from the processing unit. In particular, the error at the first induced state "$S_1$" is due to deviation in one parameter "$P_2$" belonging to the processing unit. Similarly, a second induced state "$S_2$" indicates that the computing system 104 has encountered error due to the deviation in two parameters "$P_2$, $P_3$" belonging to the processing unit. Further, a third induced state "$S_3$" indicates that the computing system 104 has encountered error due to the deviation in one parameter "$P_1$" belonging to the processing unit.

However, a fourth induced state "$S_4$" indicates that the computing system 104 has encountered an error from the memory unit. In particular, the error at the fourth induced state "$S_4$" is due to deviation in one parameter "$P_7$" belonging to the memory unit. Further, a fifth induced state "$S_5$" indicates that the computing system 104 has encountered error due to the deviation in two parameters "$P_4$, $P_7$" belonging to the memory unit.

Similarly, a sixth induced state "$S_6$" indicates that the computing system 104 has encountered an error from both processing unit and the memory unit. In particular, the error at the sixth induced state "$S_6$" is due to deviation in one parameter "$P_2$" belonging to the processing unit and one parameter "$P_7$" belonging to the memory unit. Further, a seventh induced state "$S_7$" indicates that the computing system 104 has encountered error due to the deviation in one parameter "$P_1$" belonging to the processing unit and one parameter "$P_6$" belonging to the memory unit. Further, an eight induced state "$S_8$" indicates that the computing system 104 has encountered error due to the deviation in two parameters "$P_1$, $P_3$" belonging to the processing unit and one parameter "$P_4$" belonging to the memory unit. A ninth induced state "$S_9$" indicates that the computing system 104 has encountered error due to the deviation in one parameter "$P_3$" belonging to the processing unit and two parameters "$P_4$, $P_6$" belonging to the memory unit. Similarly, a tenth induced state "$S_{10}$" indicates that the computing system 104 has encountered error due to the deviation in two parameters "$P_1$, $P_3$" belonging to the processing unit and two parameters "$P_4$, $P_5$" belonging to the memory unit.

Referring to the table-2 again, the computing system 104 may be considered to be in unhealthy condition at a final induced state "$S_n$". In other words, each of the plurality of parameters "$P_1$-$P_7$" having "1" value at the final induced state "$S_n$" is indicative of the unhealthy condition of the computing system 104. In particular, the unhealthy condition of the computing system 104 is caused due to the deviation in all three parameters "$P_1$, $P_2$, $P_3$" belonging to the processing unit and all four parameters "$P_4$, $P_5$, $P_6$, $P_7$" belonging to the memory unit.

In some examples, the plurality of induced states "$S_1$-$S_n$" represented in table-2 is orchestrated in a progressively declining health order of the computing system 104. In such examples, the initial state "$S_0$" indicates the ideal or healthy condition of the computing system 104 and the final induced state "$S_n$" indicates a completely unhealthy condition of the computing system 104. It should be noted herein that the term "ideal or healthy condition" may refer to a condition, where the one or more components of the computing system has no performance related issues. Similarly, the term "completely unhealthy condition" may refer to a condition, where the one or more components of the computing system has lot of performance related issues, necessitating the replacement of such components. For example, the computing system 104 operating at the third induced state "$S_3$" may be considered to be healthy in comparison with the same computing system 104 operating at the fourth induced state "$S_4$" or the fifth induced state "$S_5$", so on and forth.

Similarly, in some other examples, the plurality of induced states "$S_1$-$S_n$" may be orchestrated in a progressively improving health order of the computing system 104. The state "$S_n$" indicates the ideal or healthy condition of the computing system 104 and the state "$S_0$" indicates the unhealthy condition of the computing system 104. For example, the computing system 104 operating at the fourth induced state "$S_4$" may be considered to be healthy in comparison with the same computing system 104 operating at the third induced state "$S_3$" or the second induced state "$S_2$".

In one or more examples, errors in each of the plurality of induced states "$S_1$-$S_n$" of the computing system 104, may be resolved using at least one corrective action among a plurality of corrective actions "$A_{1-n}$".

Table-3 depicted below represents the plurality of induced states "$S_1$-$S_n$" and the plurality of corrective actions "$A_{1-n}$".

TABLE 3

| PLURLALITY OF INDUCED STATES | | PLURALITY OF CORRECTIVE ACTIONS ($A_{1-n}$) | | | | | | | | |
|---|---|---|---|---|---|---|---|---|---|---|
| | | PROCESSING UNIT ACTIONS | | | | MEMORY UNIT ACTIONS | | | | |
| | | $PA_1$ | $PA_2$ | $PA_3$ | ... | $PA_n$ | $MA_1$ | $MA_2$ | $MA_3$ | ... $MA_n$ |
| | | A | ... | ... | ... | ... | ... | ... | ... | ... N |
| A | $S_1$ | — | — | — | — | — | — | — | — | — — |
| : | $S_2$ | — | — | — | — | — | — | — | — | — — |
| : | $S_3$ | — | — | — | — | — | — | — | — | — — |
| : | $S_4$ | — | — | — | — | — | — | — | — | — — |
| : | $S_5$ | — | — | — | — | — | — | — | — | — — |
| : | $S_6$ | — | — | — | — | — | — | — | — | — — |
| : | $S_7$ | — | — | — | — | — | — | — | — | — — |
| : | $S_8$ | — | — | — | — | — | — | — | — | — — |
| : | $S_9$ | — | — | — | — | — | — | — | — | — — |
| : | $S_{10}$ | — | — | — | — | — | — | — | — | — — |
| : | : | — | — | — | — | — | — | — | — | — — |
| M | $S_n$ | — | — | — | — | — | — | — | — | — — |

As shown in table-3 above, the plurality of corrective actions "$A_{1-n}$" may be segregated into processing unit actions "$PA_{1-n}$" and memory unit actions "$MA_{1-n}$". In some examples, the processing unit actions "$PA_{1-n}$" may include a), processor de-configuration b) processor operating frequency change, and c) processor power change, respectively. Similarly, the memory unit actions "$MA_{1-n}$" may include a) activating spare rank online to prevent uncorrectable faults b) DIMM sparing, c) adjusting DRAM refresh rate, and d) triggering patrol scrubbing, respectively. As noted hereinabove, the plurality of corrective actions "$A_{1-n}$" is predefined by human experts based on the analysis of the historical support cases including resolutions to the historical support cases.

In one or more examples, table-3 is a representation of an initial Q-table 112. In some examples, the initial Q-table 112 includes a data structure organized as an N-by-M matrix, with columns labeled A to N including a plurality of corrective actions "$A_{1-n}$", and rows labeled A to M including a plurality of induced states "$S_1$-$S_n$". In such examples, each matrix cell of the N-by-M matrix may include a Q-value indicative of a performance impact (effectiveness) of the corresponding corrective action of the plurality of corrective actions "$A_{1-n}$" towards an error in an induced state of the computing system 104. At the beginning the initial Q-table 112 has a neutral Q-value or Q-label, for example, "NULL", "–", "LOW", "0", or "percentage", in each matrix cell. In some examples, the table-2 and the initial Q-table 112 may be stored in the computing system 104. The neutral Q-value for at least some of the cells in the initial Q-table 112 is updated/modified in the test environment 100, during the process of testing the effectiveness of the predefined corrective actions "$A_{1-n}$" against the predefined error in the plurality of induced states "$S_1$-$S_n$" of the computing system 104, while building a final Q-table or a Q-table 114 (as shown in FIG. 2) in parallel.

In some examples, the plurality of induced states "$S_1$-$S_n$" may be developed as a plurality of test cases in the test system 102 by the human experts based on the predefined errors defined for the one or more components 110 of the computing system 104. In certain examples, the plurality of test cases may be in a form of a script or command or an application programming interface (API), and the like. During the process of building the Q-table 114, the test system 102 may execute each of the plurality of test cases, so as to inject/introduce/simulate the predefined error in one or more components 110 of the computing system 104. In some examples, the test system 102 may execute the plurality of test cases at some predetermined time intervals "T", such as once in every one hour, for example.

Upon execution of each test case of the plurality of test cases, the test system 102 may inject the corresponding error in the computing system 104 so as to bring the computing system 104 into one of the plurality of induced states "$S_1$-$S_n$". For example, the test system 102 may execute a first test case at a first time interval "$T_1$" so as to induce predefined error in the parameter "$P_2$" of the computing system 104 and bring the computing system 104 into the first induced state "$S_1$". Upon introducing the error, the computing system 104 may encounter an error condition or unhealthy condition.

As the computing system 104 encounters the error condition, the analytical engine 108 may obtain a plurality of system parameters from a management controller (not shown in FIG. 1), such as a baseboard management controller (BMC) or a redfish interface of the computing system 104. It may be noted herein that the terms "system parameter" and "parameter" may be used interchangeably. Accordingly, the plurality of system parameters may also be represented by reference numerals "$P_1$-$P_7$", in accordance to one or more examples of the present disclosure. In some embodiments, a monitoring agent (not shown) of the computing system 104 may register the error in one or more parameters of the plurality of system parameters, whenever the error or the fault event occurs in the computing system 104. Subsequently, the monitoring agent may provide the plurality of system parameters to the analytical engine 108 through the management controller.

The analytical engine 108 may then analyze the plurality of system parameters to determine one or more parameters, which have deviated from the predefined range. Accordingly, the analytical engine 108 may determine that the error in the computing system 104 is caused due to the deviation in the parameter "$P_2$" belonging to the processing unit, and the induced state due to deviation in the parameter "$P_2$" is the first induced state "$S_1$". In particular, the analytical engine 108 may access table-2 to determine i) the induced state of the computing system 104 by comparing the parameter "$P_2$", which has caused error in the computing system 104 with the plurality of parameters "$P_1$-$P_7$", which are recorded in the table-2, to determine the induced state of the computing system 104. The analytical engine 108 may then access the table-3 (initial Q-table 112) to ii) select a corrective action from the plurality of corrective actions "$A_{1-n}$" corresponding to the first induced state "$S_1$" based on the plurality of Q-values stored in table-3. In the beginning, the analytical engine 108 may randomly select one of the plurality of corrective actions "$A_{1-n}$", as the plurality of Q-values corresponding to the induced state "$S_1$" has default value, for example "0" Q-value. For example, the analytical engine 108 may first choose a first corrective action "$PA_1$", followed by the second corrective action "$PA_2$", and so on and forth.

Subsequently, the analytical engine 108 may iii) execute the selected corrective action on the computing system 104. Later, the analytical engine 108 may once again collect the plurality of system parameters from the management controller to determine a current state of the computing system 104. In particular, the analytical engine 108 may iv) evaluate the plurality of system parameters to determine whether the one or more parameters have deviated from the predefined ranges.

In one example, the analytical engine 108 may determine that the first corrective action "$PA_1$" applied on the computing system 104, has caused deviations in two parameters "$P_2$, $P_3$". In such scenarios, the analytical engine 108 may once again access the table-2 to determine the current state of the computing system 104 by comparing the parameters "$P_2$, $P_3$", which have caused errors in the computing system 104 with the plurality of parameters "$P_1$-$P_7$", which are recorded in the table-2. Accordingly, the analytical engine 108 may determine that the computing system 104 is in the second induced state "$S_2$", as the parameter "$P_2$, $P_3$" which have predefined errors in the initial Q-table 112 corresponds to the second induced state "$S_2$". Thus, the analytical engine 108 determines that the first corrective action "$PA_1$" has resulted in pushing the computing system 104 into a state indicative of a declined health in comparison to the first induced state "$S_1$". In other words, the first corrective action "$PA_1$" has resulted in pushing the computing system 104 into the second induced state "$S_2$". In such examples, the analytical engine 108 may punish the first corrective action "$PA_1$" by v) updating "$U_1$" the Q-value corresponding to the first corrective action "$PA_1$" with a diminishing value, for example, a negative Q-value, such as "−5".

In such examples, the analytical engine 108 may repeat the aforementioned steps of ii) selecting the corrective action from the initial Q-table 112, iii) executing the selected corrective action, iv) evaluating the one or more parameters to determine the current state of the computing system 104, and v) updating the Q-value corresponding to the corrective action, until the computing system 104 is restored to the state indicative of the improved health of the computing system 104 in comparison with either the induced state "$S_1$" or the current state "$S_2$". For example, the analytical engine 108 may apply the second corrective action "$PA_2$" and find that the computing system 104 has restored to initial state "$S_0$". Thus, the analytical engine 108 may reward the second corrective action "$PA_2$" by updating the Q-value corresponding to the second corrective action "$PA_2$" with a progressive value, for example, a positive Q-value, such as "+5".

In one or more examples, the analytical engine 108 may update the Q-value based on a Bellman equation as represented by a formula (2), below.

$$\text{New}Q(s,a) = Q(s,a) + \alpha[R(s,a) + \gamma \max(Q'(s',a') - Q(s,a)] \quad (2)$$

Referring to formula (2) above, "NewQ(s, a)" represents new Q-value for the induced state and the corrective action, "Q(s, a)" represents current Q-value, "$\alpha$" represents learning rate, "R(s, a)" represents reward or punishment for the corrective action, "$\gamma$" represents discount rate, and "maxQ'(s', a')−Q(s, a)" represents maximum expected future reward or punishment for the corrective action.

In another example, the analytical engine 108 may determine that the first corrective action "$PA_1$" has not caused deviation in any of the plurality of parameters "$P_1$-$P_7$". Thus, the analytical engine 108 determines that the first corrective action "$PA_1$" has resulted in restoring the computing system 104 into a state indicative of an improved health in comparison to the first induced state "$S_1$". In other words, the first corrective action "$PA_1$" has resulted in restoring the computing system 104 into the initial state "$S_0$". In such examples, the analytical engine 108 may reward the first corrective action "$PA_1$" by updating "$U_1$" the Q-value corresponding to the first corrective action "$PA_1$" with a progressive value, for example, a positive Q-value, such as "+5". In some examples, the analytical engine 108 may further evaluate all remaining corrective actions to update the Q-values for each of the remaining correction actions for that induced state, for example "$S_1$".

Further, the test system 102 may execute another test case at a second time interval "$T_2$" so as to induce one or more errors in the plurality of parameters "$P_1$-$P_7$" of the computing system 104 and bring the computing system 104 into another induced state of the plurality of induced states "$S_1$-$S_n$". As discussed hereinabove, the analytical engine 108 may repeat the aforementioned steps of i) determining the induced state "$S_{1+1}$" of the computing system 104, ii) selecting the corrective action corresponding to the induced state "$S_{1+1}$" based on the plurality of Q-values stored in the Q-table 112, iii) executing the corrective action on the computing system 104, iv) evaluating the one or more parameters to determine the current state of the computing system 104, and v) updating "$U_{1+1}$" the Q-value corresponding to the corrective action in the initial Q-table 112, for the induced state "$S_{1+1}$", and thereby building the Q-table 114 in parallel.

Thus, the analytical engine 108 may continuously update the Q-value of the corrective action in the Q-table 114 based on the performance impact or the effectiveness of the corrective action in resolving the error in the induced state of the computing system 104. Accordingly, the final Q-table 114 may include at least one corrective action, which can predictably and efficiently resolve the error and improve the health condition of the computing system 104. Thus, the Q-table 114 is built based on a concept of a feedback mechanism detailed in the reinforcement learning technique.

FIG. 2 is an example Q-table 114 including a stored data structure organized as an N-by-M matrix, with columns labeled A to N including a plurality of corrective actions "$A_{1-n}$", and rows labeled A to M including a plurality of induced states "$S_1$-$S_n$". In such examples, each matrix cell of the N-by-M matrix includes a Q-value indicative of a performance impact of the corresponding corrective action of the plurality of corrective actions "$A_{1-n}$" towards an error in an induced state of a computing system. It should be noted herein that the term "performance impact" may refer to "effectiveness" of the corrective action in resolving the error in the one or more components of the computing system.

Referring to Q-table 114, in some examples, when the computing system is in a first induced state "$S_1$", a corrective action "$PA_1$" which has the Q-value of "+10", may restore a health of the computing system to a state "$S_0$", for example, which is indicative of an improved health in comparison to the induced state "$S_1$". Similarly, when the computing system is the tenth induced state "$S_{10}$", the first corrective action "$PA_1$" may be applied to a processing unit of the computing system and a corrective action "$MA_1$" may be applied to a memory unit of the computing system, so as to restore the health of the computing system to the state "$S_9$" or "$S_8$", for example, which is indicative of an improved health in comparison to the induced state "$S_{10}$". In one or more examples, the Q-value having a negative or a neutral value, for example, "−5" and "0" Q-value respectively, may indicate that those corrective actions, if applied, may result in either pushing the computing system to the state, which is indicative of a declined health in comparison to the induced state or retain the computing system in the induced state.

FIG. 3 is a block diagram depicting an example environment, for example, a mission-critical production environment 200 using a Q-table 114 to resolve errors in a computing system 204 of the production environment 200. In some examples, the production environment 200 may include a network-supported medical alert and other emergency services, or financial transactions, or online retailing services, in which the computing system 204 is expected to be "highly available". In some examples, the computing system 204 includes an analytical engine 108 and one or more components 210. It should be noted herein that the analytical engine 108 of FIG. 3 is substantially similar to the analytical engine 108 of FIG. 1. In the illustrated embodiment, the analytical engine 108 is deployed within the computing system 204. In such example embodiments, the analytical engine 208 is a software module implemented using a processor-based device (not shown in FIG. 3) of the computing system 204. In particular, the processor-based device may implement functionalities of the analytical engine 108 by executing program instructions stored in a memory (not shown in FIG. 3) of the computing system 204.

In some other embodiments, the analytical engine 108 may be a hardware module operably coupled to the computing system 204. In such example embodiments, the hardware module may include a processor-based device for implementing functionalities of the analytical engine 108 by executing program instructions stored in a memory of the hardware module. Further, as discussed in the embodiment of FIG. 1, the one or more components 210 may include a processing unit and a memory unit of the computing system 204. It may be noted herein that the Q-table 114 and table-2 are also stored in a machine readable medium of the computing system 204, as discussed in the embodiment of FIG. 1.

The computing system 204 may also include a management controller (not shown in FIG. 3), such as a baseboard management controller (BMC) or a redfish interface, and a monitoring agent (not shown in FIG. 3). The monitoring agent may register error(s) in one or more parameters of the plurality of system parameters, whenever an error or a fault event occurs in the computing system 204. The management controller may obtain the plurality of system parameters from the monitoring agent and transfer the plurality of system parameters to the analytical engine 108.

In some examples, the analytical engine 108 may analyze the plurality of system parameters to determine the one or more parameters, which have deviated from the predefined range to enter into the unhealthy condition. The analytical engine 108 may then access the table-2 to i) determine an induced state of the computing system 104 by comparing the one or more parameters, which have caused error in the computing system 104 with the plurality of parameters "$P_1$-$P_7$", which are recorded in the Q-table 114. The analytical engine 108 may then access the Q-table 114 to select a corrective action from the plurality of corrective actions "$A_{1-n}$" corresponding to the induced state, based on the plurality of Q-values stored in Q-table 114. In particular, the analytical engine 108 may select one of the plurality of corrective actions "$A_{1-n}$", which has highest Q-value. Subsequently, the analytical engine 108 may execute the selected corrective action on the computing system 204 to resolve the error in the computing system 204. Thus, the analytical engine 108 may apply the corrective action at real-time, based on the Q-value stored in the Q-table 114 to mitigate the error in one or more components 210 of the computing system 204. Since, the corrective actions in the Q-table 114 are pretested in a test environment, the analytical engine 108 may provide the accurate resolution to the computing system 204 in real time, thereby allowing the computing system 204 of the mission-critical production environment 200 to be "highly available" for providing the intended services. In some other examples, the analytical engine 108 in the production environment may also update the Q-table 114 based on new learnings of resolving errors in one or more components 210 of the computing system 204.

FIG. 4 is a block diagram of a computing system 104 including a processing resource 116 and a machine readable medium 118 storing executable program instructions. It should be noted herein that the computing system 104 referred to in FIG. 4 may be same or similar to computing system 104 described in FIG. 1. In the example embodiment, the processing resource 116 is operably coupled to the machine readable medium 118.

The processing resource 116 may be a physical processor. In some examples, the physical processor may be at least one of a central processing unit (CPU), a graphics processing unit (GPU), a microprocessor, and/or other hardware devices suitable for performing the functionality described in relation to FIG. 1. In some examples, the machine readable medium 118 is non-transitory and is alternatively referred to as a non-transitory machine readable medium.

The processing resource 116 executes one or more program instructions to perform one or more functions described in FIG. 1. For example, the processing resource 116 may execute program instructions to i) determine an induced state of the computing system 104 based on an error in one or more components of the computing system 104.

For example, the one or more components may include the processing unit and the memory unit of the computing system 104. The steps of determining the induced state of the computing system 104 are described in conjunction with FIG. 1.

The processing resource 116 may further execute the program instructions to ii) select a corrective action corresponding to the induced state based on a plurality of Q-values stored in a Q-table. It may be noted that initially, each of the plurality of Q-values is set to a neutral Q-value, for example, "0" Q-value. In such example, the processing resource 116 may randomly select one of the plurality of corrective actions. The details of selecting the corrective action from the plurality of corrective actions is described in conjunction with FIG. 1.

Further, the processing resource 116 may iii) execute the selected corrective action on the computing system 104. The corrective action may restore the health of the computing system 104 or degrade the health of the computing system 104, or remain in the induced state without having any effect in resolving the error of the computing system 104.

The processing resource 116 may further collect the plurality of system parameters from the computing system 104 and iv) evaluate the one or more parameters to determine a current state of the computing system 104. In particular, the processing resource 116 may collect the plurality of system parameters from the computing system 104 and check one or more parameters, which have caused error in the computing system with the plurality of parameters "$P_1$-$P_7$", which are recorded in the table-2 to determine the current state (health condition) of the computing system 104. The details of evaluating the one or more parameters are described in conjunction with FIG. 1.

Further, the processing resource 116 may include v) updating the Q-value of the plurality of Q-values, corresponding to the corrective action, in response to evaluation of the current state of the computing system 104. In some embodiments, the Q-value may be updated with a progressive value, for example, +5 for resolving error in the computing system 104 and not causing deviation in some other parameters of the computing system 104. In some other embodiments, the Q-value may be updated with a diminishing value, for example, −5, for not resolving the error and/or for degrading the one or more parameters of the computing system 104. The details of updating the Q-value in the Q-table is described in conjunction with FIG. 1.

In some examples, the processor based device may repeat the steps of i) to v) for each of a plurality of induced states of the computing system 104 by executing one or more corrective actions of a plurality of corrective actions, to update the plurality of Q-value in the Q-table 114, until the Q-table 114 is completed build. Similarly, the processor based device may repeat the steps of ii) to v) until the computing system 104 is restored to a state indicative of an improved health of the computing system 104 in comparison with the induced state or the current state of the computing system 104. It should be noted herein that the plurality of induced states is indicative of health of the computing system 104.

FIG. 5 is a block diagram 300 depicting a processing resource 116 and a machine readable medium 118 encoded with example instructions to process data in a computing system 104. In some examples, the computing system 104 is operated in a test environment, to build a Q-table having self-healing actions (or corrective actions) to the computing system 104, by applying a reinforcement learning technique. It should be noted herein that the computing system 104 referred to in FIG. 5 may be same or similar to computing system 104 described in FIGS. 1 and 4. The machine readable medium 118 is non-transitory and is alternatively referred to as a non-transitory machine readable medium. In some examples, the machine readable medium 118 may be accessed by the processing resource 116. In some examples, the machine readable medium 118 stores the program instructions corresponding to functionality of an analytical engine, as discussed in FIG. 1.

The machine readable medium 118 may be encoded with example instructions 302, 304, 306, 308, 310. In some examples, a test system coupled to the computing system 104 may introduce error in the computing system 104 to bring the computing system 104 into an induced state.

In such examples, the instruction 302, when executed by the processing resource 116, may implement aspects of determining the induced state of the computing system 104 based on an error in one or more components of the computing system 104. The induced state of the computing system 104 and the error in the induced state are predefined by the human experts. The step of determining the induced state of the computing system 104 may be performed by the analytical engine of the computing system 104, as described in FIG. 1.

The instruction 304, when executed, may cause the processing resource 116 to select a corrective action corresponding to the induced state based on a plurality of Q-values stored in a Q-table, as described in FIG. 1. At the beginning of building the Q-table, the analytical engine may randomly select one of the corrective action, as the Q-value for each of the plurality of corrective actions corresponding to the induced state is set to a default value, for example, "0" Q-value.

The instruction 306, when executed, may cause the processing resource 116 to execute the selected corrective action in the computing system 104, as described in FIG. 1. In one or more examples, the step of executing the selected corrective action includes applying the selected corrective action, based on the Q-value stored in the Q-table so as to mitigate the error in one or more components of the computing system. As discussed hereinabove, the selected corrective action may restore the health of the computing system or degrade the health of the computing system, or remain in the induced state without having any effect in resolving the error of the computing system.

Further, the instructions 308, when executed, may cause the processing resource 116 to evaluate one or more parameters to determine a current state of the computing system 104, as described in FIG. 1. In particular, the analytical engine may collect the plurality of system parameters from the computing system 104 and check one or more parameters, which has caused error in the computing system with the plurality of parameters "$P_1$-$P_7$", which are recorded in the table-2 to determine the current state (health condition) of the computing system 104.

In some embodiments, the instructions 310, when executed, may cause the processing resource to update the Q-value corresponding to the corrective action in response to evaluation of the current state of the computing system. In some examples, the executed corrective action on the computing system may have improved the health condition of the computing system 104. In such examples, the analytical engine may reward the corrective action and update the Q-value of the corrective action with a progressive value, for example, "+5" Q-value. However, in some other embodiments, the corrective action applied on the computing system 104 may have declined the health condition of the computing system. In such examples, the analytical engine may punish the corrective action and update the Q-value of the corrective action with a diminishing value, for example, "−5" Q-value. In the event of declined health condition, the analytical engine may repeat the process of selecting another corrective action, executing the selected corrective action, evaluating the current state of the computing system 104, and updating the Q-value of the corrective action in the Q-table, until the computing system 104 is restored to a state indicative of the improved health in comparison to the induced state or the current state of the computing system 104.

In one or more examples, the processing resource may repeat the process of executing the program instructions 302, 304, 306, 308, 310 corresponding to steps of determining the induced state of the computing system, selecting the corrective action, executing the selected corrective action, evaluating one or more parameters to determine the current state of the computing system, and updating the Q-value corresponding to the corrective action in response to evolution of the current state of the computing system respectively, for all induced state of the computing system 104, so as to completely build the Q-table.

FIG. 6 is a flow diagram depicting a method 400 of building a Q-table 114 by applying reinforcement learning. It should be noted herein that the method 400 is described in conjunction with FIG. 1.

The method 400 starts at block 402 and continues to block 404. At block 404, the method 400 includes determining an induced state of a computing system based on an error in one or more components of the computing system, as described in FIG. 1. In some examples, a test system coupled to the computing system is used to introduce error in one or more components of the computing system. In some examples, the one or more components may include a processing unit and a medium unit of the computing system 104. Further, an analytical engine executed by a processing resource of the computing system, may be used to determine the induced state of the computing system. Further, the method 400 continues to block 406.

At block 406, the method 400 includes selecting a corrective action corresponding to the induced state based on a plurality of q-values stored in a Q-table, as described in FIG. 1. The analytical engine may access the Q-table to select at least one corrective action which has highest "Q-value" for the induced state. The method 400 further continues to block 408.

At block 408, the method includes executing the selected corrective action on the computing system in order to resolve the error in the induced state of the computing system. In one or more examples, the step of executing the selected corrective action includes applying the selected corrective action, based on the Q-value stored in the Q-table so as to mitigate the error in one or more components of the computing system. As discussed hereinabove, the selected corrective action may restore the health of the computing system or degrade the health of the computing system, or remain in the induced state without having any effect in resolving the error of the computing system.

At block 410, the method includes evaluating one or more parameters to determine a current state of the computing system, as described in FIG. 1. In some examples, the analytical engine may receive a plurality of system parameters to determine the one or more parameters, which have deviated from the predefined range and compare the one or more parameters, which have deviated from the predefined range with the plurality of parameters "$P_1$-$P_7$", which are recorded in the table-2 to determine the current state of the computing system.

In some examples, at block 410, if it is determined that the current state of the computing system is indicative of an improved health or state of the computing system ("YES" at block 410), then the analytical engine may update the Q-value of the corrective action with a progressive Q-value, for example, "+5" Q-value, at block 412.

The method 400 may end at block 416 for that induced state of the computing system. However, the method 400 may repeat the steps recited in blocks 404 to 412 for other induced states of the computing system to complete the process of building the Q-table. In some examples, the method 400 may include repeat the steps 406-412 for remaining corrective actions listed in Q-table to determine the performance impact of the remaining correction actions for that induced state. After evaluating the performance impact of all remaining corrective actions for that induced state, the Q-table may include Q-value for all remaining corrective actions. In such examples, the analytical engine may choose the corrective action that has highest Q-value for resolving issues in the production environment.

In some other examples, at block 410, if it is determined that the current state of the computing system is indicative of a declined health or state, or indicative of the induced state of the computing system ("NO" at block 410), then the analytical engine may update the Q-value of the corrective action with a diminishing Q-value, for example, "−5" Q-value, at block 414. The method 400 may repeat the steps recited in blocks 406-410 until the computing system is restored to a state indicative of an improved health in comparison to the induced state or the current state. The method 400 ends at block 416.

Various features as illustrated in the examples described herein may be implemented to build a Q-table having self-healing actions (or corrective actions) to a computing system, by applying a reinforcement learning technique. In particular, the Q-table is built based on a concept of a feedback mechanism detailed in the reinforcement learning technique. Since, the Q-table includes corrective actions, which are pretesting in a test environment, an analytical engine may accurately and predicable applying such corrective actions to the computing system of production environment to resolve (self-heal) the errors in real time, thereby allowing the computing system of the mission-critical production environment to be "highly available" for providing the intended services.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
associating, by a processing resource, a computing system with a first associated induced state of a plurality of induced states, wherein:
the association of the computing system with the first associated induced state comprises comparing memory performance parameters of the computing system to corresponding memory performance parameter ranges, comparing processor performance parameters of the computing system to corresponding processor performance parameter ranges, and associating the computing system with the first associated induced state based on a result of the comparison of the memory performance parameters and the comparison of the processor performance parameters; and the induced states of the plurality of induced states are orchestrated according to a health order such that a first induced state of the plurality of induced states corresponds to a state of highest health for the computing system, a second induced state of the plurality of induced states corresponds to a state of poorest health for the computing system, and at least one other induced state of the plurality of induced states corresponds to a state of health for the computing system other than the state of highest health and other than the state of poorest heath;

selecting, by the processing resource, a given corrective action of a plurality of corrective actions corresponding to the first associated induced state based on a plurality of Q-values stored in a Q-table, wherein the Q-table comprises records, each record of the records comprises Q-values of the plurality of Q-values representing performance impacts of the plurality of corrective actions for a corresponding induced state of the plurality of induced states;

executing, by the processing resource, the given corrective action;

responsive to the execution of the given corrective action, associating the computing system with a second associated induced state of the plurality of induced states;

evaluating whether the second associated induced current state is indicative of a declined health of the computing system or an improved health of the computing system relative to the second associated induced state based on the health order; and in response to the evaluation of whether the second associated induced state is indicative of the declined health of the computer system or the improved health of the computer system, updating, by the processing resource, a Q-value of the plurality of Q-values corresponding to the given corrective action.

2. The method of claim 1, further comprising associating the computing system with a third associated induced state of the plurality of induced states; selecting another corrective action of the plurality of corrective actions corresponding to the third associated induced state; executing the another corrective action; responsive to the execution of the another correction action, associating the computing system with a fourth associated induced state of the plurality of induced states; evaluating whether the fourth associated induced state is indicative of a declined health of the computing system or an improved health of the computing system relative to the fourth associated induced state based on the health order; and in response to the evaluation of whether the fourth associated induced state is indicative of the declined health of the computer system or the improved health of the computer system, updating a Q-value of the plurality of Q-values corresponding to the another corrective action.

3. The method of claim 1, further comprising deploying, by the processing resource, the Q-table in a production environment comprising a processor-based device, wherein the processor-based device selectively applies the plurality of corrective actions based on the Q-table to mitigate errors in one or more components of the production environment.

4. The method of claim 1, wherein the health order corresponds to the plurality of induced states being orchestrated in a progressively declining order of a health of the computing system.

5. The method of claim 1, wherein the health order corresponds to the plurality of induced states being orchestrated in a progressively improving order of a health of the computing system.

6. The method of claim 1, further comprising updating the plurality of Q-values based on a Bellman equation.

7. The method of claim 1, wherein the updating of the Q-value corresponding to the given corrective action comprises revising the Q-value corresponding to the given corrective action with a progressive Q-value, responsive to the computing system being restored to a state indicative of the improved health.

8. The method of claim 1, wherein the updating of the Q-value corresponding to the given corrective action comprises revising the Q-value corresponding to the given corrective action with a diminishing Q-value, responsive to the computing system being progressed to a state indicative of the declined health.

9. The method of claim 1, wherein the Q-table comprises a stored data structure organized as an N-by-M matrix of a plurality of matrix cells, wherein each matrix cell of the plurality of matrix cells comprises a Q-value of the plurality of Q-values representing a performance impact.

10. An apparatus comprising:
a machine readable medium storing program instructions; and
a processing resource operably coupled to the machine readable medium, wherein the processing resource executes the program instructions to:
associate a computing system with a first associated induced state of a plurality of induced states, wherein:
the association of the computing system with the first associated induced state comprises comparing memory performance parameters of the computing system to corresponding memory performance parameter ranges, comparing processor performance parameters of the computing system to corresponding processor performance parameter ranges, and associating the computing system with the first associated induced state based on a result of the comparison of the memory performance parameters and the comparison of the processor performance parameters; and
the induced states of the plurality of induced states are orchestrated according to a health order such that a first induced state of the plurality of induced states corresponds to a state of highest health for the computing system, a second induced state of the plurality of induced states corresponds to a state of poorest health for the computing system, and at least one other induced state of the plurality of induced states corresponds to a state of health for the computing system other than the state of highest health and other than the state of poorest heath;
select a given corrective action of a plurality of corrective actions corresponding to the first associated induced state based on a plurality of Q-values stored in a Q-table, wherein the Q-table comprises records, each record of the records comprises Q-values of the plurality of Q-values representing performance impacts of the plurality of corrective actions for a corresponding induced state of the plurality of induced states;

execute the given corrective action;
instructions to, responsive to the execution of the given corrective action, associate the computing system with a second associated induced state of the plurality of induced states;
evaluate whether the second associated induced state is indicative of a declined health of the computing system or an improved health of the computing system relative to the second induced state based on the health order; and
in response to the evaluation of whether the second associated induced state is indicative of the declined health of the computer system or the improved health of the computer system, update a Q-value of the plurality of Q-values corresponding to the given corrective action.

11. The apparatus of claim 10, wherein the processing resource further executes the program instructions to associate the computing system with a third associated induced state of the plurality of induced states; select another corrective action of the plurality of corrective actions corresponding to the third associated induced state; execute the another correction action; responsive to the execution of the another correction action, associate the computing system with a fourth associated induced state of the plurality of induced states; evaluate whether the fourth associated induced state is indicative of a declined health of the computing system or an improved health of the computing system relative to the fourth associated induced state based on the health order; and in response to the evaluation of whether the fourth associated induced state is indicative of the declined health of the computer system or the improved health of the computer system, update a Q-value of the plurality of Q-values corresponding to the another corrective action.

12. The apparatus of claim 10, wherein the processing resource further executes the program instructions to deploy the Q-table in a production environment comprising a processor-based device, wherein the processor-based device selectively applies the plurality of corrective actions based on the Q-table to mitigate errors the error in one or more components of the production environment.

13. The apparatus of claim 10, wherein the processing resource further executes the program instructions to revise a Q-value of the plurality Q-values corresponding to the given corrective action with a progressive Q-value of the plurality of Q-values, responsive to the computing system being restored to a state indicative of the improved health.

14. The apparatus of claim 10, wherein the processing resource further executes the program instructions to revise a Q-value of the plurality of Q-values corresponding to the given corrective action with a diminishing Q-value, responsive to the computing system being progressed to a state indicative of the declined health.

15. The apparatus of claim 10, wherein the Q-table comprises a stored data structure organized as an N-by-M matrix of a plurality of matrix cells, wherein each matrix cell of the plurality of matrix cells comprises a Q-value of the plurality of Q-values representing a performance impact of the performance impacts.

16. A non-transitory machine readable medium storing instructions executable by a processing resource in a computing system, the instructions comprising:
instructions to associate the computing system with a first associated induced state of a plurality of induced states, wherein:
the association of the computing system with the first associated induced state comprises comparing memory performance parameters of the computing system to corresponding memory performance parameter ranges, comparing processor performance parameters of the computing system to corresponding processor performance parameter ranges, and associating the computing system with the first associated induced state based on a result of the comparison of the memory performance parameters and the comparison of the processor performance parameters; and
the induced states of the plurality of induced states are orchestrated according to a health order such that a first induced state of the plurality of induced states corresponds to a state of highest health for the computing system, a second induced state of the plurality of induced states corresponds to a state of poorest health for the computing system, and at least one other induced state of the plurality of induced states corresponds to a state of health for the computing system other than the state of highest health and other than the state of poorest heath;
instructions to select a given corrective action of a plurality of corrective actions corresponding to the first associated induced state based on a plurality of Q-values stored in a Q-table, wherein the Q-table comprises records, each record of the records comprises Q-values of the plurality of Q-values representing performance impacts of the plurality of corrective actions for a corresponding induced state of the plurality of induced states;
instructions to execute the given corrective action;
instructions to, responsive to the execution of the given corrective action, associate the computing system with a second associated induced state of the plurality of induced states;
instructions to evaluate whether the second associated induced current state is indicative of a declined health of the computing system or an improved health of the computing system relative to the second associated induced state based on the health order; and
instructions to update a Q-value of the plurality of Q-values corresponding to the given corrective action.

17. The non-transitory machine readable medium of claim 16, wherein the instructions further comprises instructions to associate the computing system with a third associated state of the plurality of induced states; select another corrective action of the plurality of corrective actions corresponding to the another induced state; execute the another corrective action; responsive to the execution of the another corrective action, associate the computing system with a fourth associated induced state of the plurality of induced states; evaluate whether the fourth associated induced state is indicative of a declined health of the computing system or an improved health of the computing system relative to the fourth associated induced state based on the health order; and in response to the evaluation of whether the fourth induced state is indicative of the declined health of the computer system or the improved health of the computer system, update a Q-value of the plurality of Q-values corresponding to the another corrective action.

* * * * *